(12) United States Patent
Hwang

(10) Patent No.: US 7,590,533 B2
(45) Date of Patent: Sep. 15, 2009

(54) NEW-WORD PRONUNCIATION LEARNING USING A PRONUNCIATION GRAPH

(75) Inventor: Mei-Yuh Hwang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1011 days.

(21) Appl. No.: 10/796,921

(22) Filed: Mar. 10, 2004

(65) Prior Publication Data

US 2005/0203738 A1 Sep. 15, 2005

(51) Int. Cl.
*G10L 15/00* (2006.01)
(52) U.S. Cl. .................. 704/231; 704/235; 704/251; 704/257
(58) Field of Classification Search .......... 704/231, 704/235, 251, 257
See application file for complete search history.

(56) References Cited

U.S. PATENT DOCUMENTS

| 5,649,060 | A  | * | 7/1997 | Ellozy et al. ............... 704/278 |
| 6,064,957 | A  | * | 5/2000 | Brandow et al. ............ 704/235 |
| 6,263,308 | B1 | * | 7/2001 | Heckerman et al. ......... 704/231 |
| 6,725,194 | B1 | * | 4/2004 | Bartosik et al. ............. 704/235 |
| 7,013,276 | B2 | * | 3/2006 | Bickley et al. ............... 704/255 |
| 2002/0082831 | A1 | | 6/2002 | Hwang et al. ............... 704/249 |
| 2004/0117180 | A1 | * | 6/2004 | Rajput et al. ................ 704/231 |

OTHER PUBLICATIONS

U.S. Appl. No. 10/761,451, filed Jan. 20, 2004.

Ph.D. thesis, MIT, Jun. 2002, "Modelling Out-of-Vocabulary Words for Robust Speech Recognition," by Issam Bassi, pp. 84-87.

M. McCandless, "Empirical Acquisition of Language Models for Speech Recognition," International Conference on Spoken Language Processing, 1994.

I. Bazzi and J. Glass, "Learning Units for Domain-Independent Out-of-Vocabulary Word Modeling," in Proc. European Conf. on Speech Communication and Technology, Aalborg, Sep. 2001, pp. 61-64.

I. Bazzi and J. Glass, "Modeling Out-of-Vocabulary Words for Speech Recognition," Proc. ICSLP, 401-404, Beijing, China, 2000.

M. Bisani and H. Ney, "Investigations on Joint-Multigram Models for Grapheme-to-Phoneme Conversion," Proc. ICLSP 2002, vol. 1, pp. 105-108, Denver.

S. Chen, "Conditional and Joint Models for Grapheme-to-Phoneme Conversion," Eurospeech 2003, Geneva, pp. 2033-2036.

(Continued)

*Primary Examiner*—Daniel D Abebe
(74) *Attorney, Agent, or Firm*—Theodore M. Magee; Westman, Champlin & Kelly, P.A.

(57) ABSTRACT

A method and computer-readable medium convert the text of a word and a user's pronunciation of the word into a phonetic description to be added to a speech recognition lexicon. Initially, a plurality of at least two possible phonetic descriptions are generated. One phonetic description is formed by decoding a speech signal representing a user's pronunciation of the word. At least one other phonetic description is generated from the text of the word. The plurality of possible sequences comprising speech-based and text-based phonetic descriptions are aligned and scored in a single graph based on their correspondence to the user's pronunciation. The phonetic description with the highest score is then selected for entry in the speech recognition lexicon.

23 Claims, 7 Drawing Sheets

OTHER PUBLICATIONS

P. Vozila, J. Adams, Y. Lobacheva, and R. Thomas, "Grapheme to Phoneme Conversion and Dictionary Verification Using Graphonemes," Eurospeech 2003, Geneva, pp. 2469-2472.

The European Search Report from Application No. 05101824.0, filed Mar. 9, 2005.

Westendorf, et al., "Automatische Generierung von Ausspracheworterbuchern aus Signaldaten," Proceedings of the 4th Conference on Natural Language Processing-Konvens-98, Computers Linguistucs, and Phonetics Between Language and Speech, Peter Lang, Frankfurt Am Main, Germany, 1998, pp. 213-225.

Dong et al., "Unsupervised Learning from User's Error Correction in Speech Dictation," Proceedings of the International Conference on Spoken Language Processing, Oct. 4, 2004, pp. 1-4.

* cited by examiner

NEW-WORD PRONUNCIATION LEARNING USING A PRONUNCIATION GRAPH

BACKGROUND OF THE INVENTION

The present invention relates to speech recognition. In particular, the present invention relates to improving new-word pronunciation by combining speech and text-based phonetic descriptions to generate a pronunciation.

In speech recognition, human speech is converted into text. To perform this conversion, the speech recognition system identifies a most-likely sequence of acoustic units that could have produced the speech signal. To reduce the number of computations that must be performed, most systems limit this search to sequences of acoustic units that represent words in the language of interest.

The mapping between sequences of acoustic units and words is stored in at least one lexicon (sometimes referred to as a dictionary). Regardless of the size of the lexicon, some words in the speech signal will be outside of the lexicon. These out-of-vocabulary (OOV) words cannot be recognized by the speech recognition system because the system does not know they exist. For example, sometimes during dictation, a user will find that a dictated word is not recognized by the system. This can occur because the system has a different pronunciation defined for a particular word than the user's pronunciation, i.e. the user may pronounce the word with a foreign accent. Sometimes, the word is not in the vocabulary at all. Instead, the recognition system is forced to recognize other words in place of the out-of-vocabulary word, resulting in recognition errors.

In a past speech recognition system, a user can add a word that was not recognized by the speech recognition system by providing the spelling of a word and an acoustic sample or pronunciation of the word with the user's voice.

The spelling of the word is converted into a set of phonetic descriptions using letter-to-sound rules. The input word is stored as the only entry of a Context Free Grammar(CFG). It is then scored by applying the acoustic sample to acoustic models of the phones in the phonetic descriptions. The total score for each of the phonetic descriptions includes a language model score. In a CFG, the language model probability is equal to one over the number of branches at each node in the CFG. However, since the input word is the only entry in the CFG, there is only one branch from the start node (and the only other node in the CFG is the end node). As a result, any phonetic description from the letter-to-sound rules always has a language model probability of 1.

In a separate decoding path, the acoustic sample is converted into a phonetic description by identifying a sequence of syllable-like units that provide the best combined acoustic and language model score based on acoustic models for the phones in the syllable-like units and a syllable-like unit n-gram language model.

The score for the phonetic sequence identified through the letter-to-sound CFG and the score for most likely sequence of syllable-like units identified through the syllable-like unit n-gram decoding are then compared. The phonetic sequence with the highest score is then selected as the phonetic sequence for the word.

Thus, under this prior art system, the letter-to-sound decoding and the syllable-like unit decoding are performed in two separate parallel paths. This has been less than ideal for a number of reasons.

First, because the two paths do not use a common language model, the scores between the two paths cannot always be meaningfully compared. In particular, since the language model for the CFG always provides a probability of 1, the score for the letter-to-sound phonetic description will usually be higher than the syllable-like unit description, which relies on an n-gram language model that is usually significantly less than 1. (The language model probability for the syllable-like units is of the order of 10-4).

Because of this, the prior art system tends to favor the phonetic sequence from the letter-to-sound rules even when the acoustic sample is better matched to the phonetic description from the syllable-like unit path.

The second accuracy problem occurs with generating pronunciations for combination words such as "voicexml". It is important to note that the CFG path and the n-gram syllable path are independent of each other in the prior art system. Thus, a combination word like "voicexml" can result in pronunciation errors because the selected pronunciation must be either the CFG pronunciation or the n-gram syllable pronunciation. However, Letter-to-sound (LTS) rules used with a CFG engine tend to perform well on relatively predictable words, like "voice" but poorly for unpredictable words like "xml" where the correct pronunciation is almost unrelated to how it is spelled.

In contrast, the n-gram syllable model generally performs reasonably well in generating a pronunciation for words like "xml" because it attempts to capture any sequence of sounds or syllables in the acoustic sample, regardless of the spelling. However it does not perform as well as a CFG engine for a predictable word like "voice".

For these reasons, pronunciation errors can result from combination words that combine, for example, a predictable word with an acronym such as "voicexml" if the phonetic descriptions from the two decoding systems are evaluated in two separate paths.

A speech recognition system for improving pronunciation of combination words such as "voicexml" would have significant utility.

SUMMARY OF THE INVENTION

A method and computer-readable medium convert the text of a word and a user's pronunciation of the word into a phonetic description to be added to a speech recognition lexicon. Initially, a plurality of at least two possible phonetic descriptions are generated. One phonetic description is formed by decoding a speech signal representing a user's pronunciation of the word. At least one other phonetic description is generated from the text of the word. The plurality of possible sequences comprising speech-based and text-based phonetic descriptions are aligned to generate a pronunciation graph. The pronunciation graph is then re-scored by re-using the user's pronunciation speech. The phonetic description with the highest score is then selected for entry in the speech recognition lexicon.

One aspect of the invention is the use of syllable-like units (SLUs) to decode the acoustic pronunciation into a phonetic description. The syllable-like units are generally larger than a single phoneme but smaller than a word. The present invention provides a means for defining these syllable-like units using a mutual information based data driven approach that does not require language specific linguistic rules. A language model based on these syllable-like units can be constructed and used in the speech decoding process.

Another aspect of the present invention allows users to enter an audible pronunciation of a word that is very different from a typical pronunciation that corresponds with the spelling. For example, a foreign word can be audibly pronounced while the text of an English word is entered. Under this aspect of the invention, a new-word phonetic description added to the lexicon can be retrieved from the lexicon and converted into an audible signal comprising, for example, a foreign word translation of an English word.

DETAILED DESCRIPTION OF ILLUSTRATIVE EMBODIMENTS

Figure 1:
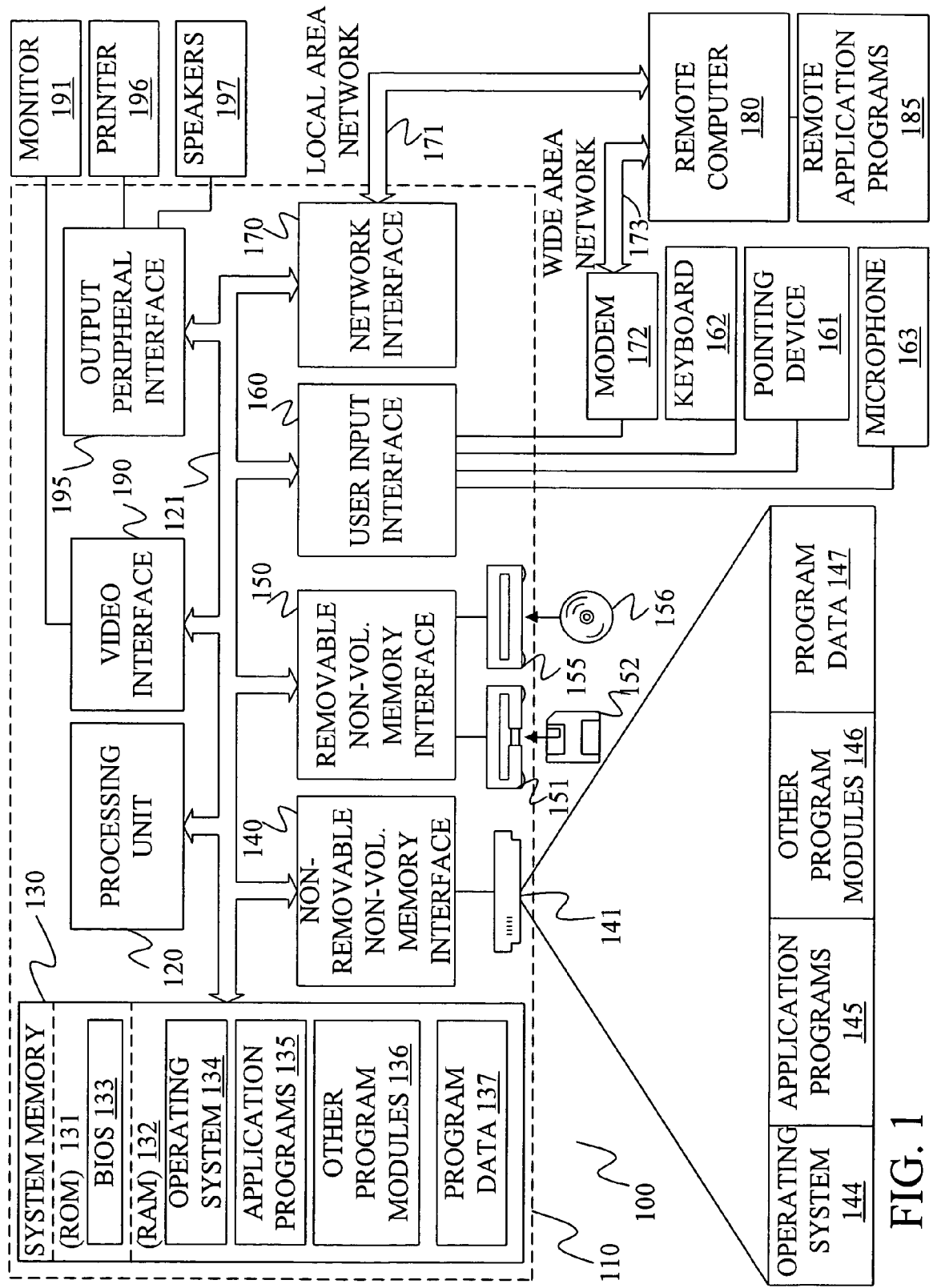
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
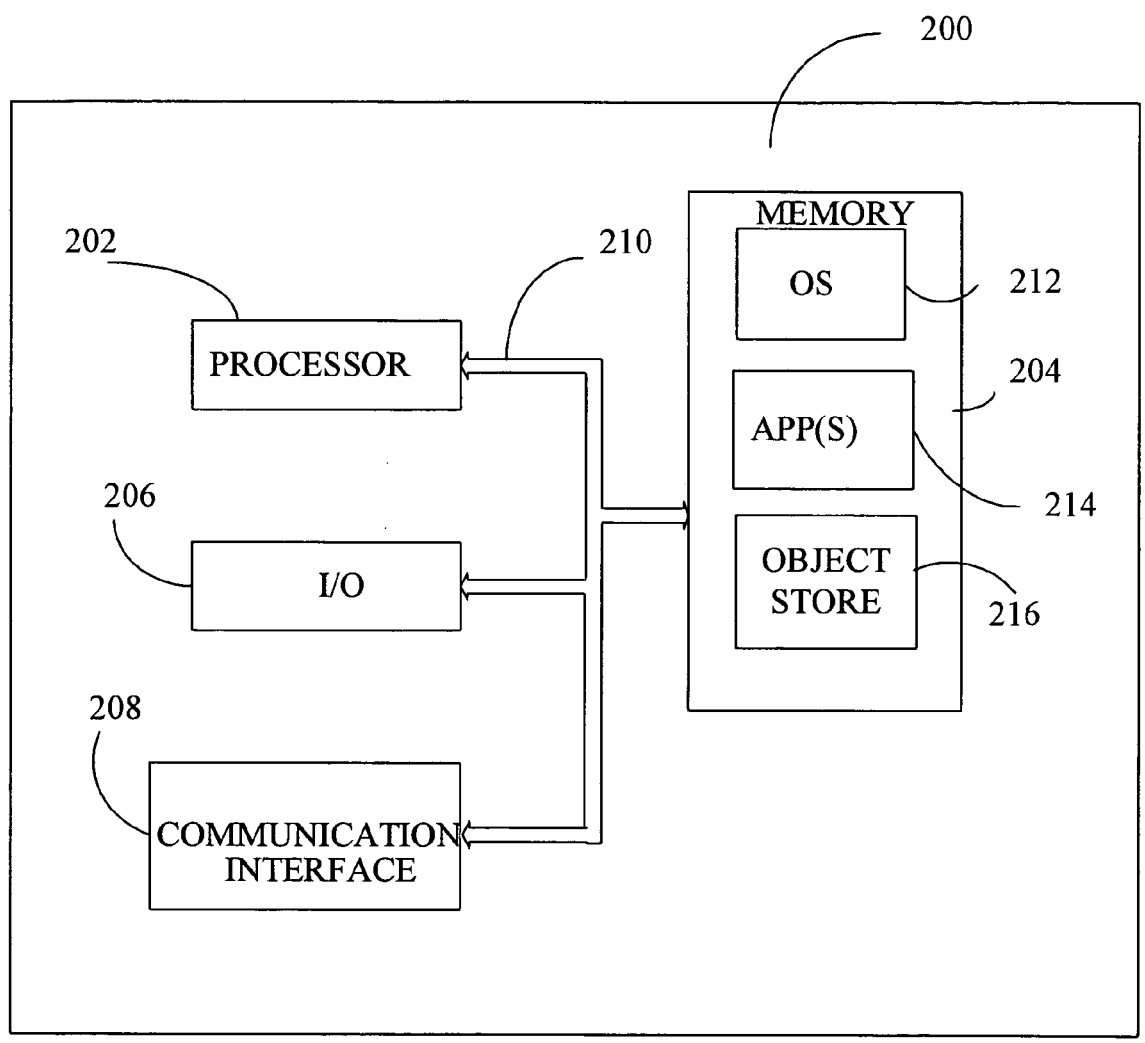
FIG. 2 is a block diagram of a general mobile computing environment in which the present invention may be practiced.

FIG. 2 is a block diagram of a mobile device 200, which is an alternative exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
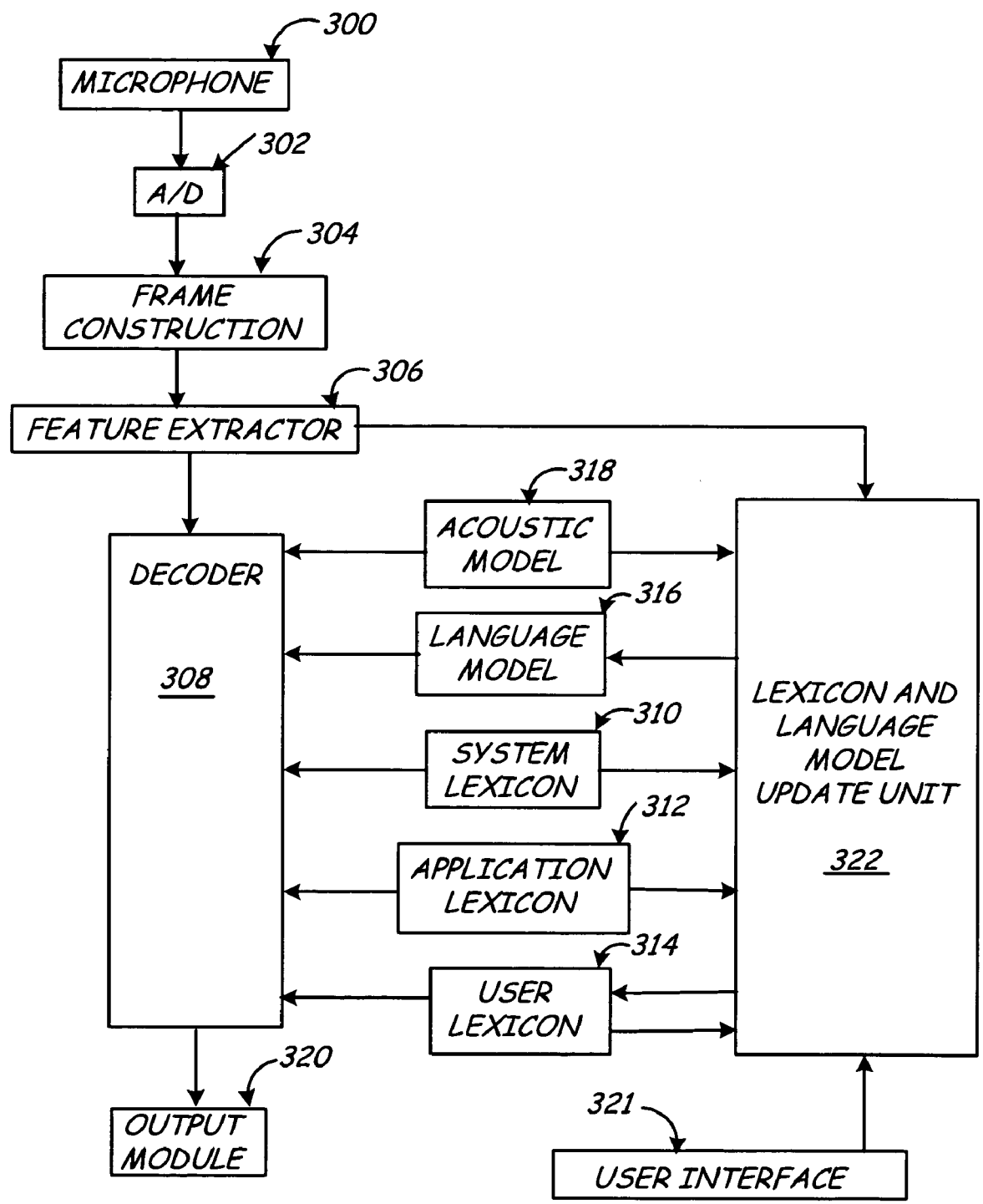
FIG. 3 is a block diagram of a speech recognition system under the present invention.

FIG. 3 provides a more detailed block diagram of speech recognition modules that are particularly relevant to the present invention. In FIG. 3, an input speech signal is converted into an electrical signal, if necessary, by a microphone 300. The electrical signal is then converted into a series of digital values by an analog-to-digital or A/D converter 302. In several embodiments, A/D converter 302 samples the analog signal at 16 kHz and 16 bits per sample thereby creating 32 kilobytes of speech data per second.

The digital data is provided to a frame construction unit 304, which groups the digital values into frames of values. In one embodiment, each frame is 25 milliseconds long and begins 10 milliseconds after the beginning of the previous frame.

The frames of digital data are provided to a feature extractor 304, which extracts a feature from the digital signal. Examples of feature extraction modules include modules for performing Linear Predictive Coding (LPC), LPC derived cepstrum, Perceptive Linear Prediction (PLP), Auditory model feature extraction, and Mel-Frequency Cepstrum Coefficients (MFCC) feature extraction. Note that the invention is not limited to these feature extraction modules and that other modules may be used within the context of the present invention.

Feature extractor 306 can produce a single multi-dimensional feature vector per frame. The number of dimensions or values in the feature vector is dependent upon the type of feature extraction that is used. For example, mel-frequency cepstrum coefficient vectors generally have 12 coefficients plus a coefficient representing power for a total of 13 dimensions. In one embodiment, a feature vector is computed from the mel-coefficients by taking the first and second derivative of the mel-frequency coefficients plus power with respect to time. Thus, for such feature vectors, each frame is associated with 39 values that form the feature vector.

During speech recognition, the stream of feature vectors produced by feature extractor 306 is provided to decoder 308, which identifies a most likely or probable sequence of words based on the stream of feature vectors, system lexicon 310, application lexicon 312, if any, user lexicon 314, language model 316, and acoustic model 318.

In most embodiments, acoustic model 318 is a Hidden Markov Model consisting of a set of hidden states, with one state per frame of the input signal. Each state has an associated set of probability distributions that describe the likelihood of an input feature vector matching a particular state. In some embodiments, a mixture of probabilities (typically 10 Gaussian probabilities) is associated with each state. The Hidden Markov Model also includes probabilities for transitioning between two neighboring model states as well as allowed transitions between states for particular linguistic units. The size of the linguistic units can be different for different embodiments of the present invention. For example, the linguistic units may be senones, phonemes, diphones, triphones, syllables, or even whole words.

System lexicon 310 consists of a list of linguistic units (typically words or syllables) that are valid for a particular language. Decoder 308 uses system lexicon 310 to limit its search for possible linguistic units to those that are actually part of the language. System lexicon 310 also contains pronunciation information (i.e. mappings from each linguistic unit to a sequence of acoustic units used by acoustic model 318). Optional application lexicon 312 is similar to system lexicon 310, except application lexicon 312 contains linguistic units that are added by a particular application and system lexicon 310 contains linguistic units that were provided with the speech recognition system. User lexicon 314 is also similar to system lexicon 310, except user lexicon 314 contains linguistic units that have been added by the user. Under the present invention, a method and apparatus are provided for adding new linguistic units, especially to user lexicon 314.

Language model 316 provides a set of likelihoods or probabilities that a particular sequence of linguistic units will appear in a particular language. In many embodiments, language model 316 is based on a text database such as the North American Business News (NAB), which is described in greater detail in a publication entitled CSR-III Text Language Model, University of Penn., 1994. Language model 316 can be a context-free grammar, a statistical n-gram model such as a trigram, or a combination of both. In one embodiment, language model 316 is a compact trigram model that determines the probability of a sequence of words based on the combined probabilities of three-word segments of the sequence.

Based on acoustic model 318, language model 316, and lexicons 310, 312, 314, decoder 308 identifies a most likely sequence of linguistic units from all possible linguistic unit sequences. This sequence of linguistic units represents a transcript of the speech signal.

The transcript is provided to an output module 320, which handles the overhead associated with transmitting the transcript to one or more applications. In one embodiment, output module 320 communicates with a middle layer that exists between the speech recognition engine of FIG. 3 and one or more applications, if any.

Under the present inventions, new words can be added to user lexicon 314 by entering the text of the word at user interface 321 and pronouncing the word into microphone 300. The pronounced word is converted into feature vectors by A/D converter 302, frame construction 304 and feature extractor 306. During the process of adding a word, these feature vectors are provided to a lexicon update unit 322 instead of decoder 308. Update unit 322 also receives the text of the new word from user interface 321. Based on the feature vectors and the text of the new word, lexicon update unit 322 updates user lexicon 314 and language model 316 through a process described further below.

Figure 4:
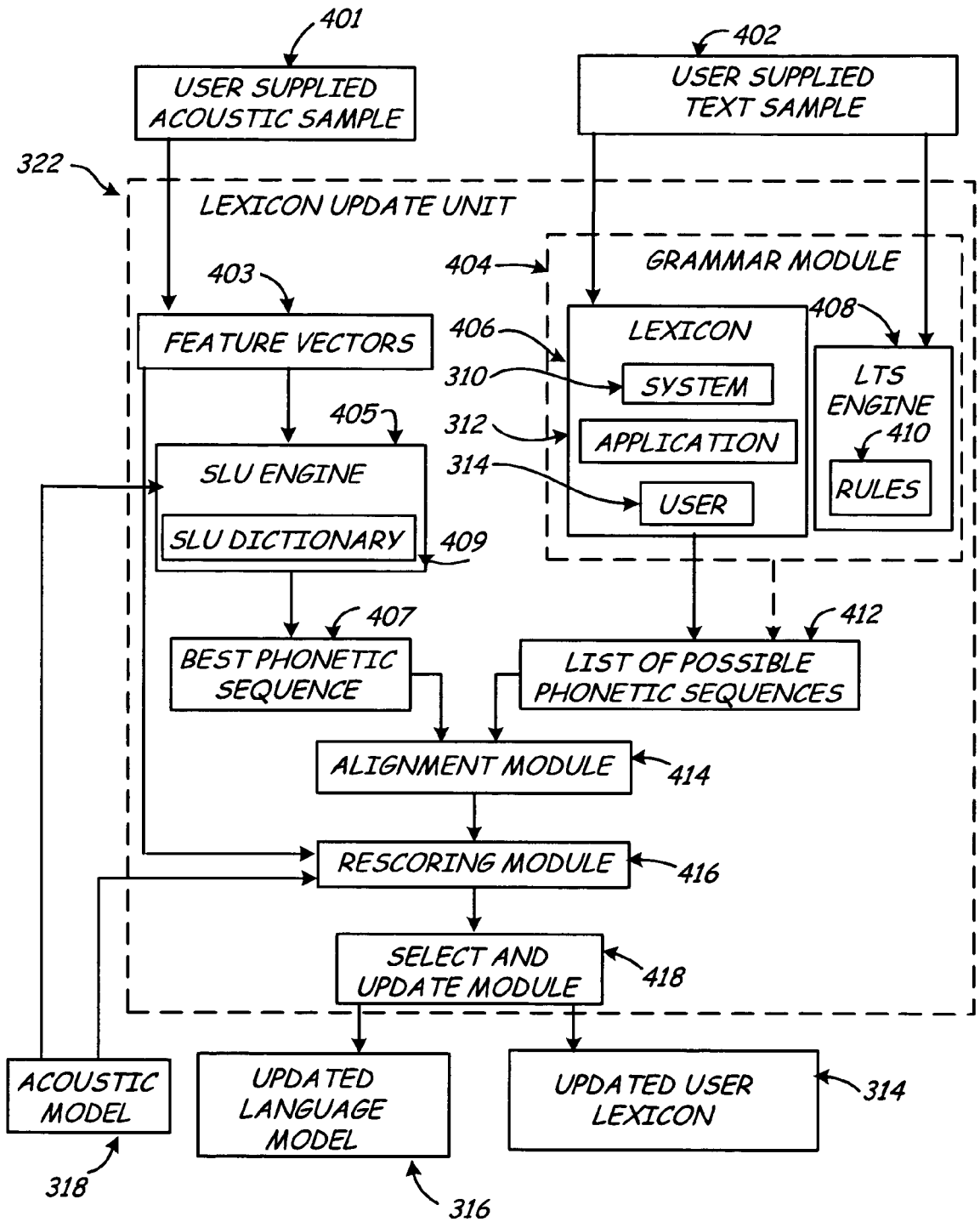
FIG. 4 is a block diagram of lexicon update components of one embodiment of the present invention.
Figure 5:
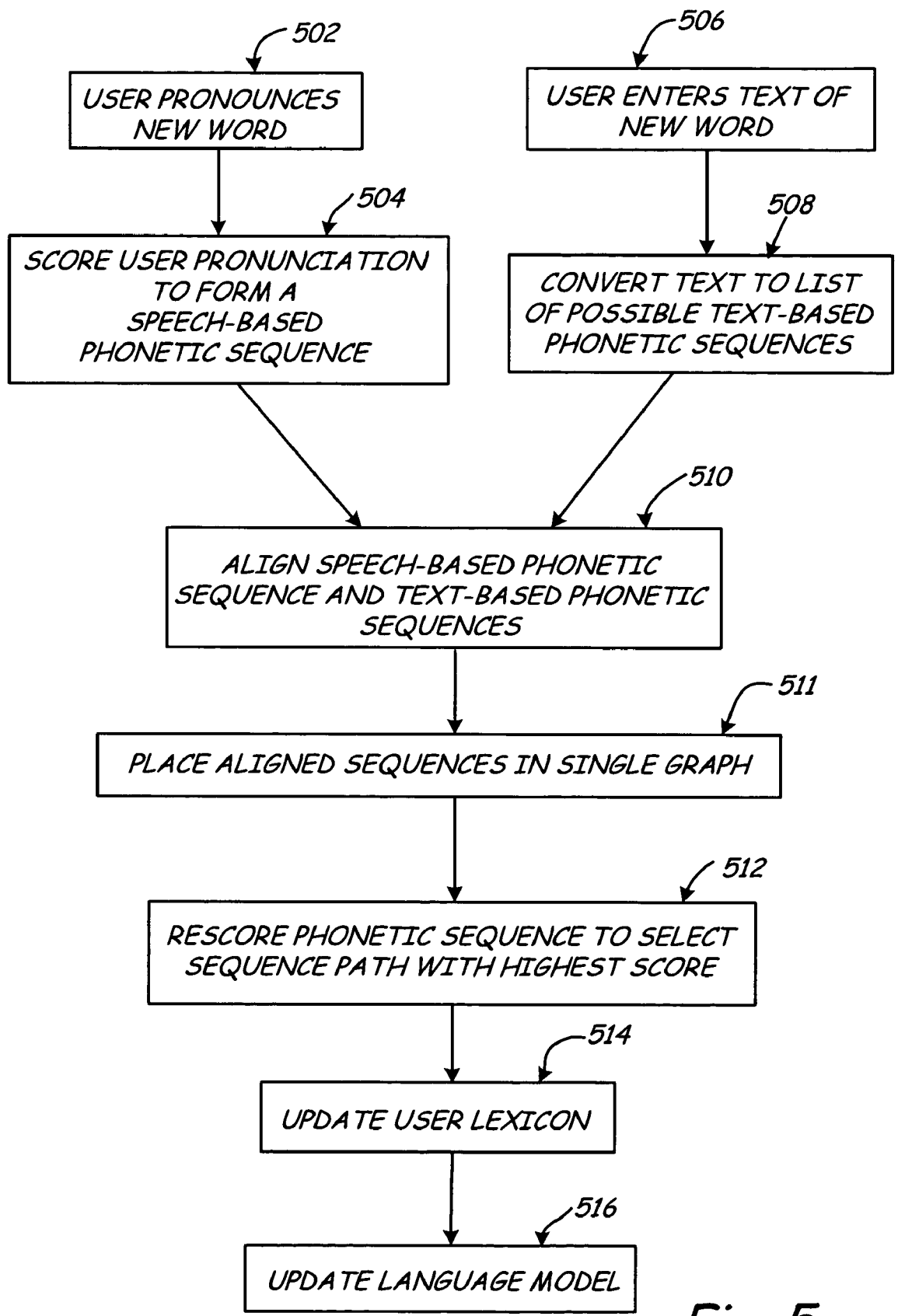
FIG. 5 is a flow diagram of a method of adding a word to a speech recognition lexicon under the present invention.

FIG. 4 provides a block diagram of the components in lexicon update unit 322 that are used to update user lexicon 314 and language model 316. FIG. 5 provides a flow diagram of a method implemented by the components of FIG. 4 for updating user lexicon 314.

At step 502, the user enters the new word by pronouncing the word into microphone 300 to produce a user supplied acoustic sample 401. User supplied acoustic sample 401 is converted to feature vectors 403 as described above, which are provided to lexicon update unit 322. Specifically, feature vectors 403 are provided to syllable-like unit (SLU) engine 405 to generate a most likely sequence of syllable-like units that can be represented by feature vectors 403 at step 504 of FIG. 5. SLU engine 405 comprises or accesses SLU dictionary 409 and acoustic model 318 to generate the most likely sequence of SLUs, typically based on a highest probability score. SLU engine 403 then converts the most likely sequence of syllable-like units into a sequence of phonetic units, which is provided to alignment module 414. SLU dictionary 409 is described in greater detail in the description corresponding to FIG. 7 below.

It is important to note that in some cases the user's pronunciation of a new word can be very different than a typical pronunciation. For instance, a speaker might pronounce an English word by substituting a foreign translation of the English word. This feature, for example, would permit a speech recognition lexicon to store the text or spelling of a word in one language and the acoustic description in a second language different from the first language.

At step 506, the user enters the text of a new word to produce user supplied text sample 402. Note that step 506 may be performed before, after, or concurrently with step 502. User supplied text sample 402 is provided to grammar module 404, which converts the text into a list of possible text-based phonetic sequences at step 508. Specifically, grammar module 404 constructs a grammar such as a context free grammar for user supplied text sample 402. Grammar module 404 comprises or accesses lexicon 406 and Letter-to-sound (LTS) engine 408. Grammar module 404 first searches lexicon 406 comprising system lexicon 310, optional application lexicon 312, and user lexicon 314 to retrieve possible phonetic descriptions, pronunciations, or sequences for user-supplied text sample 402, if any.

LTS engine 408 converts user-supplied text sample 402 into one or more possible phonetic sequences, especially when the word is not found in lexicon 406. This conversion is performed by utilizing a collection of pronunciation rules 410 that are appropriate for a particular language of interest. In most embodiments, the phonetic sequences are constructed of a series of phonemes. In other embodiments, the phonetic sequence is a sequence of triphones. Grammar module 404 thus generates one or more possible text-based phonetic sequences 412 from lexicon 406 and LTS engine 408.

Referring back to FIG. 4, best phonetic sequence 407 from SLU engine 405 and list of possible phonetic sequences 412 from grammar module 404 are provided to alignment module 414. At step 510, alignment module 414 aligns phonetic sequences 407 and 412 in a similar manner as well-known alignment modules and/or methods for calculating speech recognition error rates due, for example, from substitution errors, deletion errors, and insertion errors. In some embodiments, the alignment can be performed using a minimum distance between two sequence strings (e.g. a correct reference and a recognition hypothesis). Alignment module 414 generates a list, graph or table of aligned phonetic sequences.

At step 511, alignment module 414 places the aligned phonetic sequences in a single graph. During this process, identical phonetic units that are aligned with each other are combined onto a single path. Differing phonetic units that are aligned with each other are placed on parallel alternative paths in the graph.

The single graph is provided to rescoring module 416. At step 512, feature vectors 403 are used again to rescore possible combinations of phonetic units represented by paths through the single graph. Under one embodiment, rescoring module 416 performs a Viterbi search to identify the best path through the graph using acoustic model scores generated by comparing the feature vectors 403 produced by the user's pronunciation of the word with the model parameters stored in acoustic model 318 for each phonetic unit along a path. This scoring is similar to the scoring performed by decoder 308 during speech recognition.

Score select and update module 418 selects the highest scoring phonetic sequence or path though the single graph. The selected sequence is provided to update user lexicon 314 at step 514 and language model 316 at step 516.

Figure 6:
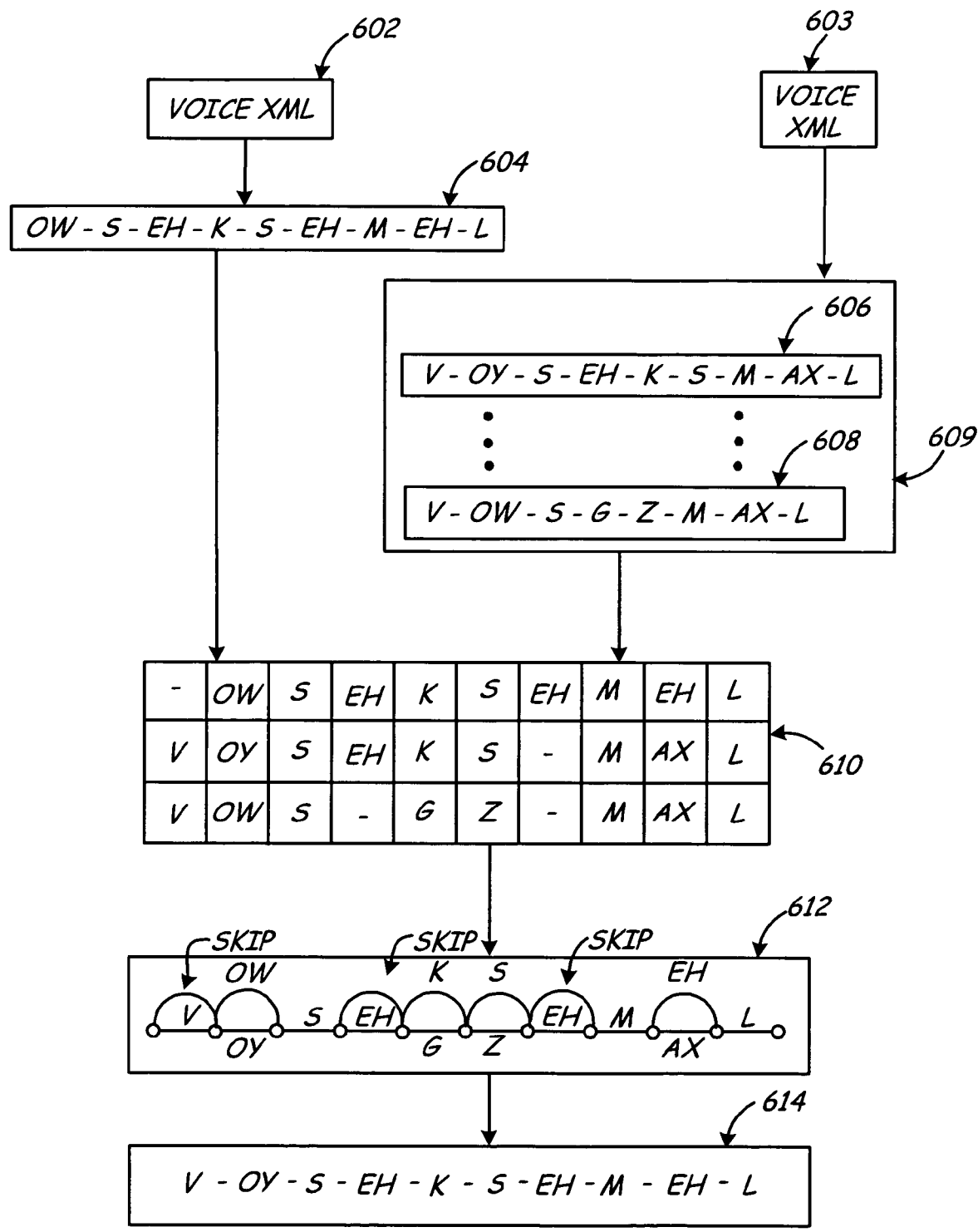
FIG. 6 is a flow diagram illustrating implementation of the present invention to a specific word.

FIG. 6 illustrates an example of how the present invention processes or learns a pronunciation for a word. Block 602 illustrates the user's pronunciation of the word "voicexml" and block 603 represents the entered text for "voicexml". The word "voicexml" is illustrative of advantages of the present invention in generating a pronunciation of a combination word as described above. A first portion of the word "voicexml" or "voice" is a relatively predictable word or word segment that LTS engines such as LTS engine 408 in FIG. 4 typically can process accurately. However, the second portion of the word, "xml", is an unpredictable or atypical word or acronym, which LTS engines can have accuracy problems processing. However, typical SLU engines such as SLU engine 405 can generally process words or word segments such as "xml" well because SLU engines rely on the user's acoustic pronunciation.

Block 604 illustrates a most likely phonetic sequence generated such as by SLU engine 405 in FIG. 4 and step 504 in FIG. 5. Thus, the best pronunciation for the acoustic or spoken version of the word "voicexml" is as follows:

ow-s-eh-k-s-eh-m-eh-l.

In this case, either the user did not enunciate the phonetic unit "v" or the SLU model did not predict the phonetic unit "v" well. As a result, the phonetic unit "v", which would be expected, was dropped from the beginning of the phonetic sequence.

At block 609 a list of possible phonetic sequences 606 and 608 for the spelling or text version of the word "voicexml" is generated by LTS engine 408 including the following sequences of phonetic units:

v-oy-s-eh-k-s-m-ax-l.
v-ow-s-g-z-m-ax-l

The phonetic sequences from blocks 604 and 609 are combined by alignment module 414 in an alignment structure shown in block 610. Typically, this alignment is performed using dynamic programming and a cost function that is based on the differences between the phonetic sequences given various alignments. In block 610, the aligned phonetic units appear in the same vertical column. It is noted that some columns have a "-" which represents an empty path that does not have a phonetic unit associated with it, meaning that column is optional or skippable.

Block 612 illustrates a single graph constructed from aligned structure 610 comprising possible phonetic sequences that can be formed from the aligned structure. Block 612 represents a search structure in which phonetic units are placed on paths between nodes. Within the structure, transitions are permitted between phonetic units identified from the SLU engine, speech-based phonetic units, and phonetic units identified by the LTS engine, text-based phonetic units. Block 612 also illustrates that a selected path can include "skips" where no phonetic unit is included from a particular column in the path.

As described above, the phonetic sequence or path is selected using the user's pronunciation of the word and the acoustic model. Block 614 illustrates the selected phonetic sequence or path in accordance with the present invention, and is provided below:

v-oy-s-eh-k-s-eh-m-eh-l.

Note that the final path begins with a phonetic sequence predicted by the LTS engine but ends with a phonetic sequence predicted by the SLU engine. Under the prior art, this would not be possible. Thus, the present invention selects a phonetic sequence from a single graph that incorporates possible phonetic sequences from both a speech based SLU engine and a text-based LTS engine to generate a more accurate pronunciation of a word.

Syllable-like-unit (SLU) Set

Figure 7:
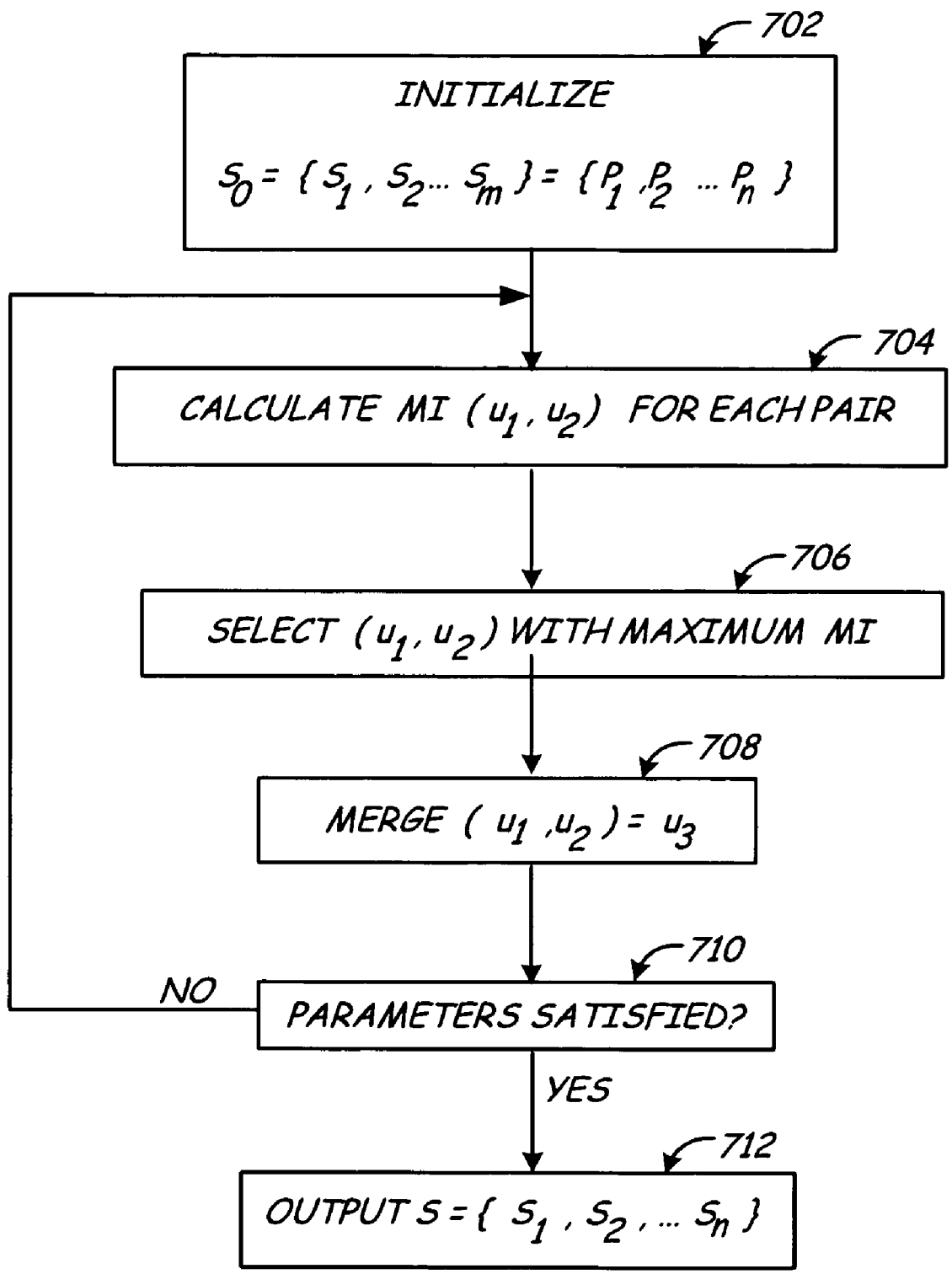
FIG. 7 is a flow diagram for constructing a set of syllable-like units.

FIG. 7 illustrates a method of constructing a set or dictionary of syllable-like-units (SLUs) 409, which can be used in some embodiments of the present invention. Generally, the method of FIG. 7 can be advantageous because it is a data-based approach, which does not require language specific linguistic rules. Thus, the approach illustrated in FIG. 7 can be used in any language and is relatively inexpensive to implement because it does not require skilled linguists that can be necessary with other approaches, especially linguistic rule-based approaches.

The method of FIG. 7 employs mutual information (MI) to construct an SLU set and uses an algorithm similar to the algorithm described in Ph.D. thesis entitled, "Modeling Out-of-vocabulary Words For Robust Speech Recognition" by Issam Bazzi, 2000, which was used in a different context. In the present invention, a set of syllable-like units of a predetermined or limited size, e.g. 10,000 units, is constructed given a large phonetic dictionary, e.g. a training dictionary of perhaps 50,000 or more words with phonetic descriptions.

At block 702, the initial SLU set $S_0$ is equal to a set of phones $P=\{p_1, p_2, \ldots p_n\}$, typically the 40 phones found in the English speech recognition system, so that $S_0=\{(s_1, s_2, \ldots s_m\}=\{p_1, p_2, \ldots p_n\}$, where m and n are the number of SLUs and phones, respectively, and m=n initially.

Let $(u_1, u_2)$ be any pair of SLUs in a current iteration. At block 704, the mutual information of pairs of linguistic units $(u_1, u_2)$ found in entries in the dictionary is calculated with the following equation.

$$MI(u_1, u_2) = Pr(u_1, u_2) \log \frac{Pr(u_1, u_2)}{Pr(u_1)Pr(u_2)} \qquad \text{Eq. 1}$$

where $MI(u_1,u_2)$ is the mutual information of syllable-like unit pair $(u_1,u_2)$, $Pr(u_1,u_2)$ is joint probability of $(u_1,u_2)$, and $Pr(u_1)$ and $Pr(u_2)$ are the unigram probabilities of $u_1$ and $u_2$, respectively.

Unigram probabilities $Pr(u_1)$ and $Pr(u_2)$ are calculated using the following equations:

$$Pr(u_1) = \frac{Count(u_1)}{Count(*)} \qquad \text{Eq. 2}$$

$$Pr(u_2) = \frac{Count(u_2)}{Count(*)} \qquad \text{Eq. 3}$$

where $Count(u_1)$ and $Count(u_2)$ are the number of times syllable-like units $u_1$ and $u_2$ are found in the training dictionary, respectively, and $Count(*)$ is the total number of syllable-like unit instances in the training dictionary. The joint probability of $(u_1,u_2)$ can be computed by the following equation:

$$\begin{aligned} Pr(u_1, u_2) &= Pr(u_2 \mid u_1) Pr(u_1) \qquad \text{Eq. 4} \\ &= \frac{Count(u_1, u_2)}{Count(u_1,*)} \frac{Count(u_1)}{Count(*)} \\ &= \frac{Count(u_1, u_2)}{Count(*)} \end{aligned}$$

where $Count(u_1,u_2)$ is the number of times the pair $(u_1,u_2)$ appears together (i.e. adjacent) in the training dictionary.

At block 706, the pair $(u_1,u_2)$ having the maximum mutual information is selected or identified. At block 708, the pair $(u_1,u_2)$ with maximum mutual information is merged into a new and longer syllable-like unit $u_3$. New syllable-like unit $u_3$ replaces or substitutes for pair $(u_1,u_2)$ in the words in the training dictionary.

At block 710, a decision is made whether to terminate the iterations. In some embodiments, parameters controlling the maximum length of an SLU can be used. For example, the maximum syllable-like unit length can be set to be 4 phones. If the selected length is reached, then abort merging the selected pair and instead check the next pair with highest mutual information. If no more pair is available or if the number of SLUs (m) reaches the desired number, or the maximum mutual information falls below a certain threshold, the method of FIG. 7 proceeds to block 712 where SLU set S is output. Otherwise, the method returns to block 704 where mutual information of syllable-like units is re-calculated after the new unit u3 is generated and unigram and bigram counts of affected ones are re-computed. In one embodiment, only one pair of syllable-like units is merged at each iteration. In other embodiments, however, a selected number of pairs (e.g. 50 pairs) can be merged at each iteration, if speed is a concern such as in Bazzi's thesis.

When the algorithm of FIG. 7 terminates, the input or training dictionary is segmented into the final set of SLUs. A syllable-like unit n-gram can then be trained from the segmented dictionary and implemented with the present invention. This data driven approach has been found to achieve slightly better accuracy than rule-based syllabification approaches. More importantly, however, the approach can be used in any language without code change because language specific linguistic rules are not needed.

Although the present invention has been described with reference to particular embodiments, workers skilled in the art will recognize that changes may be made in form and detail without departing from the spirit and scope of the invention.

What is claimed is:

1. A computer-readable storage medium having computer-executable instructions stored thereon that when executed by a computer cause the computer to perform steps comprising:
   generating a set of syllable-like units using mutual information before decoding a speech signal to identify a sequence of syllable-like units;
   generating a speech-based phonetic description of a word without reference to the text of the word by decoding a speech signal representing the user's pronunciation of the word to generate the speech-based phonetic description of the word, wherein decoding a speech signal comprises identifying a sequence of syllable-like units from the speech signal;
   generating a text-based phonetic description of the word based on the text of the word;
   aligning the speech-based phonetic description and the text-based phonetic description on a phone-by-phone basis to form a single graph; and
   selecting a phonetic description from the single graph.

2. The computer-readable storage medium of claim 1, wherein generating a syllable-like unit using mutual information comprises:
   calculating mutual information values for pairs of sub-word units in a training dictionary;
   selecting a pair of sub-word units based on the mutual information values; and
   merging the selected pair of sub-word units into a syllable-like unit.

3. The computer-readable storage medium of claim 1, wherein generating the text-based phonetic description comprises using a letter-to-sound rule.

4. The computer-readable storage medium of claim 1, wherein selecting a phonetic description from the single graph comprises comparing a speech sample to acoustic models of phonetic units in the single graph.

5. A computer-readable storage medium having computer-executable instructions stored thereon that when executed by a computer cause the computer to perform steps comprising:
   receiving text of a word for which a phonetic pronunciation is to be added to a speech recognition lexicon;
   receiving a representation of a speech signal produced by a person pronouncing the word;
   converting the text of the word into at least one text-based phonetic sequence of phonetic units;
   generating a speech-based phonetic sequence of phonetic units from the representation of the speech signal;
   placing the phonetic units of the at least one text-based phonetic sequence and the speech-based phonetic sequence in a search structure that allows for transitions between phonetic units in the text-based phonetic sequence and phonetic units in the speech-based phonetic description; and
   selecting a phonetic pronunciation from the search structure, wherein the selected phonetic pronunciation comprises phonetic units of the speech-based phonetic sequence that differ from phonetic units of the at least one text-based phonetic sequence and phonetic units other than phonetic units of the speech-based phonetic sequence.

6. The computer-readable storage medium of claim 5, wherein placing the phonetic units in a search structure comprises aligning the speech-based phonetic sequence and the at least one text-based phonetic sequence to identify phonetic units that are alternatives of each other.

7. The computer-readable storage medium of claim 6, wherein the search structure contains a single path for a phonetic unit that is found in both the text-based phonetic sequence and the speech-based phonetic sequence.

8. The computer-readable storage medium of claim 6, wherein aligning the speech-based phonetic sequence and the at least one text-based phonetic sequence comprises calculating a minimum distance between two phonetic sequences.

9. The computer-readable storage medium of claim 6, wherein selecting the phonetic pronunciation is based in part on a comparison between acoustic models of phonetic units and the representation of the speech signal.

10. The computer-readable storage medium of claim 5, wherein generating a speech-based phonetic sequence of phonetic units comprises:
  generating a plurality of possible phonetic sequences of phonetic units;
  using at least one model to generate a probability score for each possible phonetic sequence; and
  selecting the possible phonetic sequence with the highest score as the speech-based phonetic sequence of phonetic units.

11. The computer-readable storage medium of claim 10, wherein using at least one model comprises using an acoustic model and a language model.

12. The computer-readable storage medium of claim 11, wherein using a language model comprises using a language model that is based on syllable-like units.

13. The computer-readable storage medium of claim 10, wherein selecting a phonetic pronunciation comprises scoring paths through the search structure based on at least one model.

14. The computer-readable storage medium of claim 13, wherein the at least one model comprises an acoustic model.

15. A method for adding an acoustic description of a word to a speech recognition lexicon, the method comprising:
  generating a text-based phonetic description based on the text of a word;
  generating a speech-based phonetic description without reference to the text of the word;
  aligning the text-based phonetic description and the speech based phonetic description in a structure, the structure comprising paths representing phonetic units, at least one path for a phonetic unit from the text-based phonetic description being connected to a path for a phonetic unit from the speech-based phonetic description;
  selecting a sequence of paths through the structure; and
  generating the acoustic description of the word based on the selected sequence of paths wherein the acoustic description comprises a phonetic unit found in the speech-based phonetic description but not in the text-based phonetic description and a second phonetic unit found in the text-based phonetic description but not in the speech-based phonetic description.

16. The method of claim 15, wherein selecting a sequence of paths comprises generating a score for a path in the structure.

17. The method of claim 16, wherein generating a score of a path comprises comparing a user's pronunciation of a word to a model for a phonetic unit in the structure.

18. The method of claim 16, further comprising generating a plurality of text-based phonetic descriptions based on the text of the word.

19. The method of claim 18, wherein generating the speech-based phonetic description comprises decoding a speech signal comprising a user's pronunciation of the word.

20. The method of claim 19, wherein decoding a speech signal comprises using a language model of syllable-like units.

21. The method of claim 20, further comprising constructing the language model of syllable-like units though steps of:
  calculating mutual information values for pairs of syllable-like units in a training dictionary;
  selecting a pair of syllable-like units based on the mutual information values; and
  removing the selected pair and substituting a new syllable-like unit in place of the removed selected pair in the training dictionary.

22. The method of claim 21, further comprising:
  recalculating mutual information values for remaining pairs of syllable-like units in the training dictionary;
  selecting a new pair of syllable-like units based on the recalculated mutual information values; and
  removing the new pair of syllable-like units and substituting a second new syllable-like unit in place of the new pair of syllable-like units in the training dictionary.

23. The method of claim 22, further comprising using the training dictionary to generate a language model of syllable-like units.

* * * * *